US010620309B2

United States Patent
Knight

(10) Patent No.: US 10,620,309 B2
(45) Date of Patent: Apr. 14, 2020

(54) SYNTHETIC APERTURE RADAR TARGET MODELING

(71) Applicant: Chad Knight, Hyde Park, UT (US)

(72) Inventor: Chad Knight, Hyde Park, UT (US)

(73) Assignee: Utah State University Space Dynamics Laboratory

( * ) Notice: Subject to any disclaimer, the term of this patent is extended or adjusted under 35 U.S.C. 154(b) by 331 days.

(21) Appl. No.: 15/866,227

(22) Filed: Jan. 9, 2018

(65) Prior Publication Data

US 2018/0143316 A1    May 24, 2018

Related U.S. Application Data

(63) Continuation-in-part of application No. 14/702,265, filed on May 1, 2015, now abandoned.

(60) Provisional application No. 61/987,035, filed on May 1, 2014.

(51) Int. Cl.
*G01S 13/90* (2006.01)
*G01S 7/41* (2006.01)

(52) U.S. Cl.
CPC .......... *G01S 13/9005* (2013.01); *G01S 7/411* (2013.01); *G01S 13/904* (2019.05); *G01S 13/9076* (2019.05)

(58) Field of Classification Search
CPC ............................... G01S 13/9005; G01S 7/41
USPC .......................................................... 342/25
See application file for complete search history.

(56) References Cited

U.S. PATENT DOCUMENTS

| | | | |
|---|---|---|---|
| 7,245,250 B1 * | 7/2007 | Kalayeh | G01S 13/9011 342/189 |
| 7,386,034 B2 | 6/2008 | Korpet et al. | |
| 8,125,370 B1 | 2/2012 | Rogers et al. | |
| 2012/0188368 A1 | 7/2012 | Shechtman et al. | |

* cited by examiner

*Primary Examiner* — Timothy A Brainard

(57) ABSTRACT

For synthetic aperture radar (SAR) pixel vectoring, a method identifies target features of a target from a plurality of SAR signals. The method further classifies the target from the target features. In addition, the method enhances a pixel vector of the target in response to the target classification.

20 Claims, 7 Drawing Sheets

SYNTHETIC APERTURE RADAR TARGET MODELING

CROSS-REFERENCE TO RELATED APPLICATIONS

This is a continuation-in-part application of and claims priority to U.S. patent application Ser. No. 14/702,265 entitled "SYNTHETIC APERTURE RADAR TARGET MODELING" and filed on May 1, 2015 for Chad P. Knight, which is incorporated herein by reference, and which claims priority to U.S. Provisional Patent Application No. 61/987,035 entitled "SYNTHETIC APERTURE RADAR TARGET MODELING" and filed on May 1, 2014 for Chad P. Knight, which is incorporated herein by reference.

FIELD

The subject matter disclosed herein relates to synthetic aperture radar (SAR) and more particularly relates to SAR target modeling.

BACKGROUND

Description of the Related Art

SAR signals are scene dependent, and often difficult to model.

BRIEF SUMMARY

A method for SAR target modeling is disclosed. The method identifies target features of a target from a plurality of SAR signals. The method further classifies the target from the target features. In addition, the method enhances a pixel vector of the target in response to the target classification.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
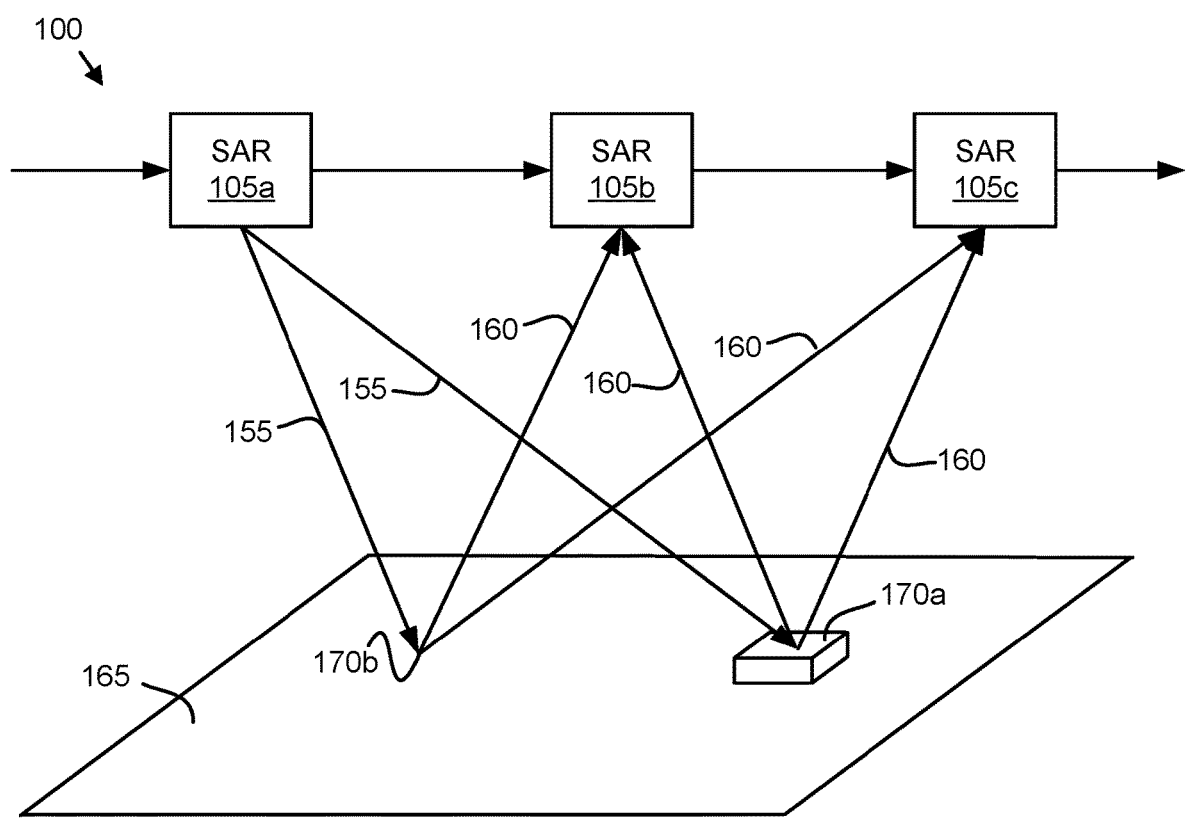
FIG. 1A is a drawing illustrating one embodiment of a SAR scan.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Python, Ruby, Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Knight, Chad P., "Convex Model-Based Aperture Radar Processing" is incorporated herein by reference. The description of elements in each figure may refer to elements of proceeding figures. Like numbers refer to like elements in all figures, including alternate embodiments of like elements.

FIG. 1A is a drawing illustrating one embodiment of a SAR scan 100. In the depicted embodiment, a SAR 105 is moving relative to a scene 165. The SAR 105 may be mounted on an airplane. The SAR 105 may periodically illuminate the scene 165 with electromagnetic pulses 155. The electromagnetic pulses 155 may reflect from targets 170a-b in the scene 165 and be received as a plurality of SAR signals 160 by the SAR 105 at a subsequent position such as SAR 105*b* and SAR 105*c*. Targets 170*a-b* may be planar targets 170*b* such as open ground or object targets 170*a* such as a building.

Different portions of the electromagnetic pulse 155 may be received by the SAR 105 at different positions, such as SAR 105*b* and SAR 150*c*. The SAR signals 160 received at the different positions form a synthetic aperture.

In one embodiment, the SAR signals 160 include polarized components. For example, the electromagnetic pulses 155 may be transmitted with a horizontal polarization. Alternatively, the electromagnetic pulses 155 may be transmitted with a vertical polarization. In addition, the electromagnetic pulses 155 may be transmitted with a specified polarization angle.

The magnitude of the SAR signals 160 vary as a function of the polarization of the electromagnetic pulses 155 and geometries of the target 170. For example, a horizontal geometry of the target 170 may reflect SAR signals 160 with a strong magnitude in response to electromagnetic pulses 155 with horizontal polarization. However, the same horizontal geometry of the target 170 may reflect SAR signals 160 with a weak magnitude in response to electromagnetic pulses 155 with vertical polarization.

In the past, angular dependencies of the SAR signals 160 made generating accurate pixel vectors of the targets 170*a-b* difficult. The embodiments described herein classify a target 170 from target features and enhance a pixel vector of the target 170*a-b* in response to the target classification as will be described hereafter.

Figure 1B:
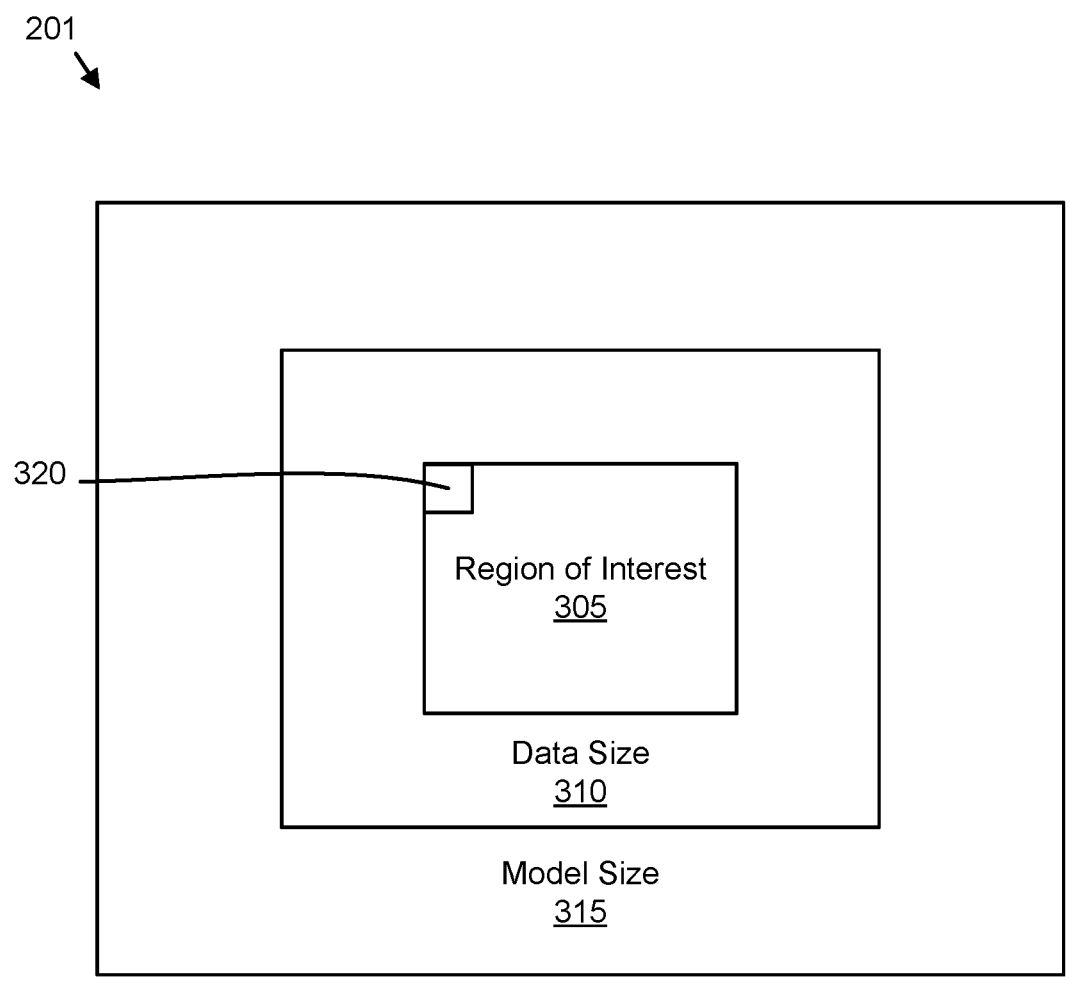
FIG. 1B is a schematic block diagram illustrating one embodiment of SAR data organization.

FIG. 1B is a schematic block diagram illustrating one embodiment of SAR data organization 201. The data organization 201 includes a region of interest 305, a data size 310, and a model size 315. The region of interest 305, data size 310, and model size 315 may represent arrays of pixels for both the SAR signals 160 and/or a pixel vector for a target 170.

The region of interest 305 is an area of pixels 320 within the scene 165 where an accurate estimate of the scene reflectivity is desired. The pixels 320 may be embodied in a pixel vector. The region of interest 305 may be a target 170. A pixel 320 is shown within the region of interest 305. Each of the region of interest 305, the data size 310, and the model size 315 include a plurality of pixels 320.

The data size 310 defines the pixels 320 required for the accurate estimate of the scene reflectivity in the region of interest 305. Because the SAR 105 generates a scene image from multiple sets of SAR signals 160 received at multiple locations for multiple synthetic apertures, a sufficiently large data size 130 is required to process the region of interest 305 for a target 170. The data size 310 is represented by an input image vector $b_{img}$ that includes all pixels 320 in the data size 310. The model size 315 is represented by the estimated image vector x that includes all the pixels 320 of the model size 315.

The model size 315 may represents the pixels 320 for all SAR signals 160 that are received. The region of interest 305 may be selected to contain low variance target features of the target 170. The target 170 may be classified from the region of interest 305 and a pixel vector incorporating the model size 305 may be enhanced in response to the target classification as will be described hereafter.

Figure 1C:
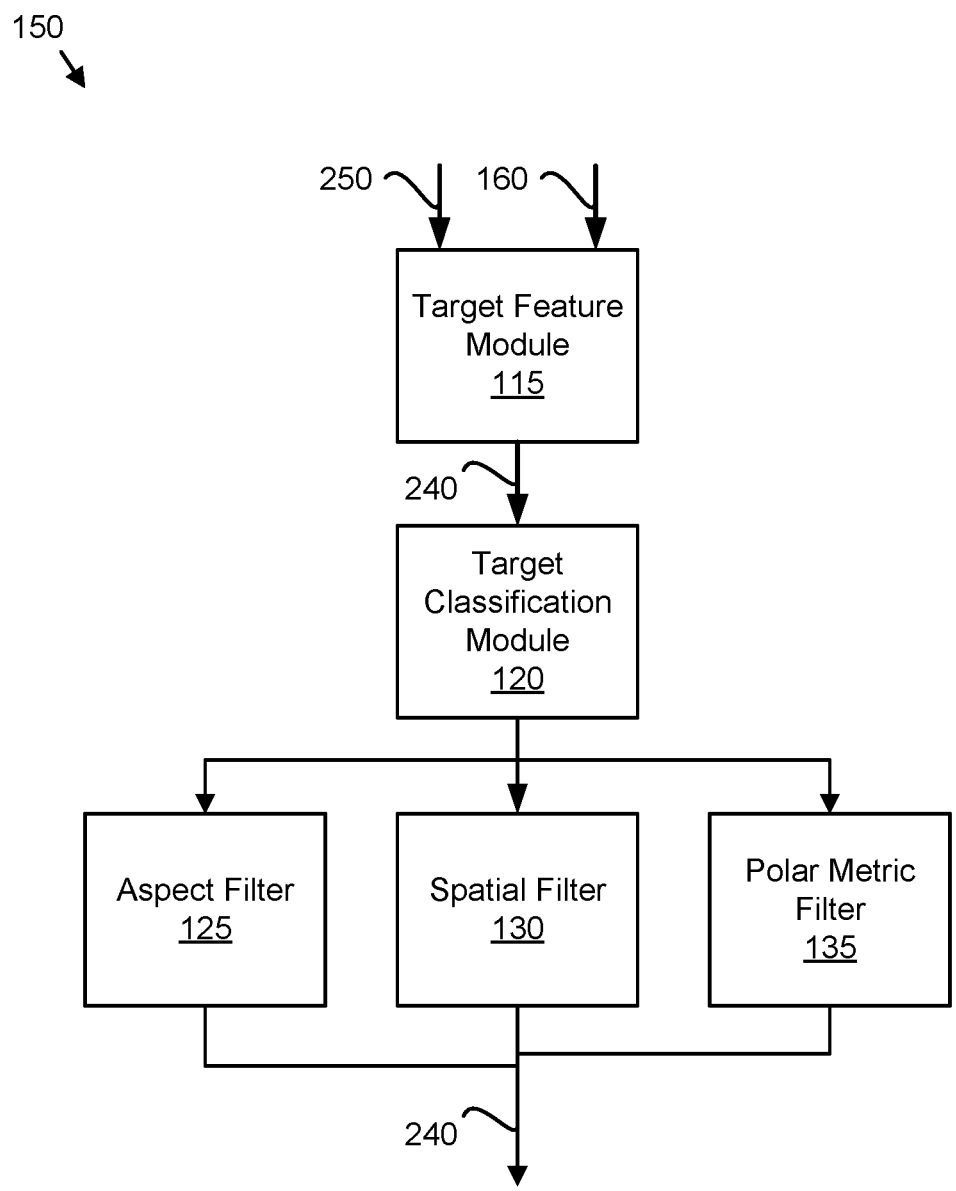
FIG. 1C is a schematic block diagram illustrating one embodiment of an SAR pixel vectoring process.

FIG. 1C is a schematic block diagram illustrating one embodiment of an SAR pixel vectoring process 150. The SAR pixel vectoring process 150 receives the SAR signals b 160 and a spatial impulse response matrix A 250. The spatial impulse response matrix A 250 may represent a response of each pixel 320 from an ideal isotropic reflector target 170. The spatial impulse response matrix A 250 may be used to estimate the pixel vector x 240 for the scene 165. Equation 1 shows the relationship between the spatial impulse response matrix A 250, the pixel vector x 240, and the SAR signals b 160.

$$Ax=b \qquad \text{Equation 1}$$

A target feature module 115 may generate the pixel vector 240 for the target 170. The pixel vector 240 may have pixels 320 that are distinguished from adjacent pixels 320 in one or more synthetic apertures of the plurality of SAR signals 160. In a certain embodiment, the target 170 is manually selected by an operator and the pixel vector 240 is automatically generated in response to the operator selection.

The pixel vector 240 may be enhanced using one or more of an aspect filter 125 and a spatial filter 130. A target classification module 120 may classify the target 170 and/or pixel vector 240 based on target features of the pixel vector 240. The pixel vector 240 may be enhanced by enhancing a target response of the target 170.

Target features are responses of a SAR signal 160 including spatial features, aspect responses, and polar metric responses. The target classification module 120 may classify the target 170 and/or pixel vector 240 as one or more of a planar target and an object target. In addition, the target 170 may be classified as a polarized signal target.

Based on the classification of the target 170 and/or pixel vector 240, combinations of the aspect filter 125 and the spatial filter 130 are used to enhance the target response.

The spatial filter 130 may enhance the pixel vector 240 by minimizing the relationship of Equation 2.

$$|Ax-b|_2 \qquad \text{Equation 2}$$

The spatial filter 130 may comprise a low-pass filter. The spatial filter 130 may reduce the SAR signals 160 based on the pixel vector 240. The spatial filter 130 may determine a mean of the plurality of SAR signals 160 for the region of interest 305 and/or target 170. In one embodiment, the spatial filter 130 determines a mean of the plurality of SAR signals 160 in the spatial impulse response matrix 250. Alternatively, the spatial filter 130 may determine a mean of SAR signals 160 in the input image vector 245.

The aspect filter 125 may comprise a high pass filter. In one embodiment, the aspect filter 125 comprises a glint filter. The glint filter may filter coherent scattering of the plurality of SAR signals 160. The aspect filter 125 may enhance the SAR signals 160 with a magnitude that is not congruent with the mean of the plurality of SAR signals 160 for the target 170.

The polar metric filter 135 may filter unpolarized SAR signals 160 of the plurality of SAR signals 160 in response to classifying the target 170 as a polarized signal target.

Figure 2A:
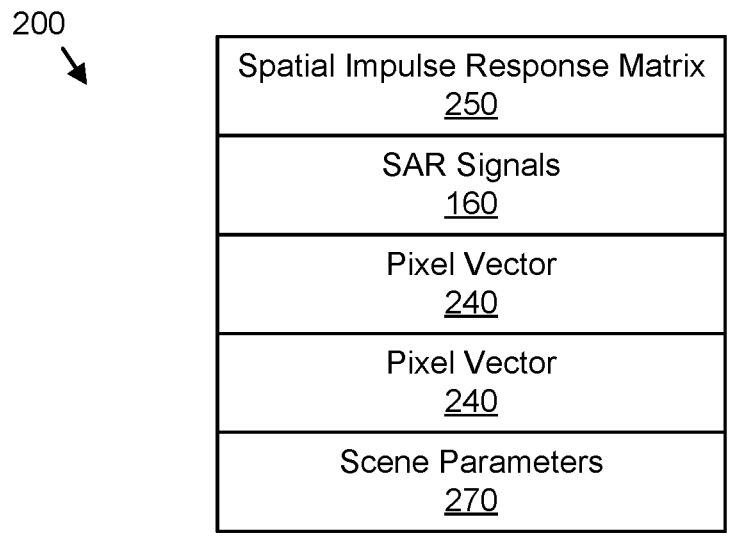
FIG. 2A is a schematic block diagram illustrating one embodiment of SAR data.

FIG. 2A is a schematic block diagram illustrating one embodiment of SAR data 200. The SAR data 200 maybe organized as a data structure in a memory. In the depicted embodiment, the SAR data 200 includes the spatial impulse response matrix 250, one or more instances of pixel vectors 240, and scene parameters 270.

The SAR data 200 may include one or more pixel vectors 240. The SAR data 200 may also include SAR signals 160 classified by the polarization of the electromagnetic pulse 155. For example, a data field may indicate the polarization of the electromagnetic pulse 155 resulting in the SAR data 160.

Figure 2B:
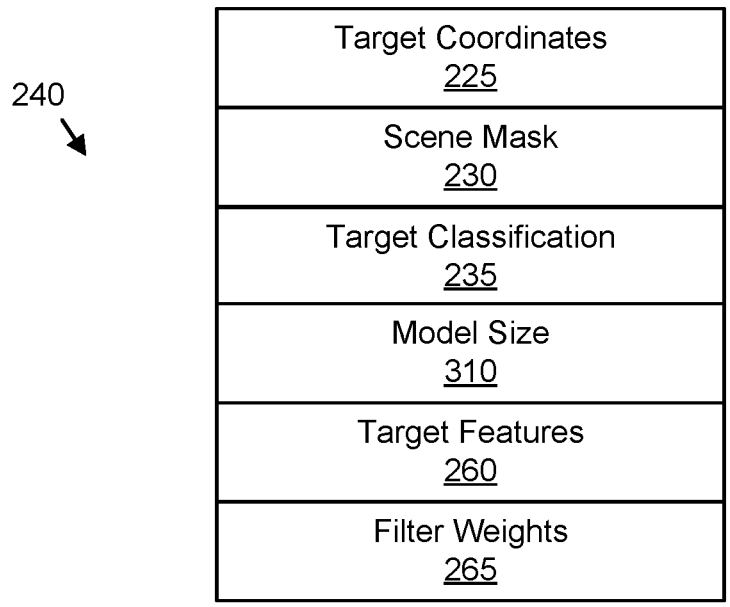
FIG. 2B is a schematic block diagram illustrating one embodiment of target data.

The pixel vector 240 is described in more detail in FIG. 2B. The scene parameters 270 may include antenna patterns, electromagnetic pulse generation locations, and the like.

FIG. 2B is a schematic block diagram illustrating one embodiment of the pixel vector 240. The pixel vector 240 maybe organized as a data structure in a memory. In the depicted embodiment, the pixel vector 240 includes target coordinates 225, a scene mask 230, a target classification 235, the model size 310, target features 260, and filter weights 265.

The target coordinates 225 may identify the target 170 within the scene 165. The target coordinates 225 may be an absolute position of the target 170. In addition, the target coordinates 225 may describe the dimensions of the target 170. In one embodiment, the target coordinates 225 include geometric features of the target 170 such as surface textures, planes, curves, vertices and/or edges. The embodiments may exploit the geometrical features enhance responses of the pixel vector 240 while suppressing undesirable features of the pixel vector 240.

The scene mask 230 may filter out all pixels 320 from the pixel vector 240 except pixels of a region of interest 305 and/or a target 170. The scene mask 230 may be used to reduce the pixels 320 processed to those of the region of interest 305 and/or target 170.

The target classification 235 may classify a target 170. In one embodiment, the target classification 235 is one or more of a planar target, an object target, a point-scattering target, a diffuse scattering target, and a polarized signal target.

The target features 260 may describe features of a target 170 and/or region of interest 305. The target features 260 may include dimensions of the target 170 and/or region of interest 305. In addition, the target features 260 may include one or more vertices of the target 170 and/or region of interest 305. The target features 260 may also include one or more planar features of the target 170 and/or one or more curved features of the target 170.

The filter weights 265 specify weights for the aspect filter 125, the spatial filter 130, and the polar metric filter 135.

The filter weights 265 may include an aspect filter weight $w_f$ and a spatial filter weight $w_g$. The filter weights 265 may weight the filters 125, 130 to one or more of the aspect filter 125 and the spatial filter 130 based on the target classification 235. If the target classification 235 is a planar target, the filters 125, 130 may be weighted to the spatial filter 130. If the target classification 235 is an object target, the filters 125, 130 may be weighted to the aspect filter 125. Table 1 lists exemplary base filter weights 265 based on the target classification 235.

TABLE 1

| Target Classification 235 | Aspect Filter Weight $w_f$ | Spatial Filter Weight $w_g$ |
|---|---|---|
| Planar Target | 30% | 70% |
| Object Target | 70% | 30% |

Table 2 lists alternative exemplary base filter weights 265 based on the target classification 235.

TABLE 2

| Target Classification 235 | Aspect Filter Weight $w_f$ | Spatial Filter Weight $w_g$ |
|---|---|---|
| Planar Target | 20% | 80% |
| Object Target | 80% | 20% |

In one embodiment, each filter weight 265 of Table 1 may be adjusted by ±10 percent. The spatial filter weight of the spatial filter 130 may be weighted in the range of 60-90 percent and the aspect filter weight of the aspect filter 125 may be weighted in the range of 10-40 percent in response to classifying the target 170 as the planar target. In addition, the spatial filter weight the spatial filter 130 may be weighted to 10-40 percent and the aspect filter weight of the aspect filter 125 may be weighted in the range of 60-90 percent in response to classifying the target 170 as the object target. Tables 3-5 lists exemplary base filter weights 265 based on the target classification 235.

TABLE 3

| Target Classification 235 | Aspect Filter Weight Range $w_f$ | Spatial Filter Weight Range $w_g$ |
|---|---|---|
| Planar Target | 10-40% | 60-90% |
| Object Target | 60-90% | 10-40% |

TABLE 4

| Target Classification 235 | Aspect Filter Weight Range $w_f$ | Spatial Filter Weight Range $w_g$ |
|---|---|---|
| Planar Target | 20-30% | 70-80% |
| Object Target | 70-80% | 20-30% |

TABLE 5

| Target Classification 235 | Aspect Filter Weight Range $w_f$ | Spatial Filter Weight Range $w_g$ |
|---|---|---|
| Planar Target | 5-45% | 55-95% |
| Object Target | 55-95% | 5-45% |

Figure 3:
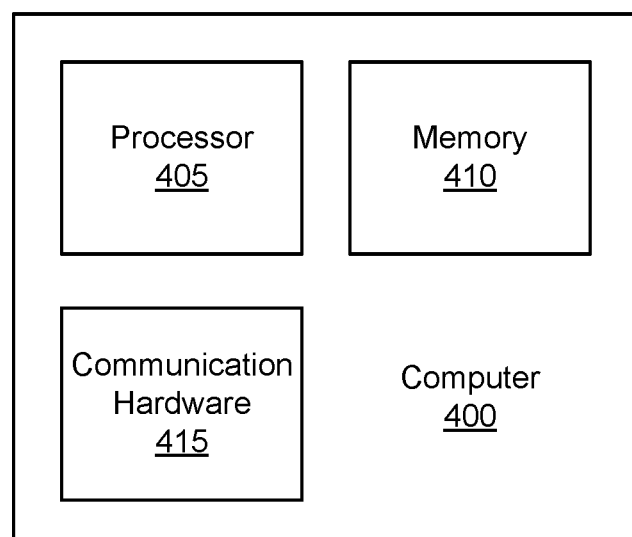
FIG. 3 is a schematic block diagram illustrating one embodiment of a computer.

FIG. 3 is a schematic block diagram illustrating one embodiment of a computer 400. The target feature module 115, the target classification module 120, the aspect filter 125, the spatial filter 130, and the SAR data 200 may be embodied in the computer 400. The computer 400 includes a processor 405, a memory 410, and communication hardware 415. The memory 410 may be a computer readable storage medium such as a semiconductor storage device, a hard disk drive, a holographic storage device, a micromechanical storage device, or the like. The memory 410 may store computer readable program code. The processor 405 may execute the computer readable program code. The communication hardware 415 may communicate with other devices.

Figure 4A:
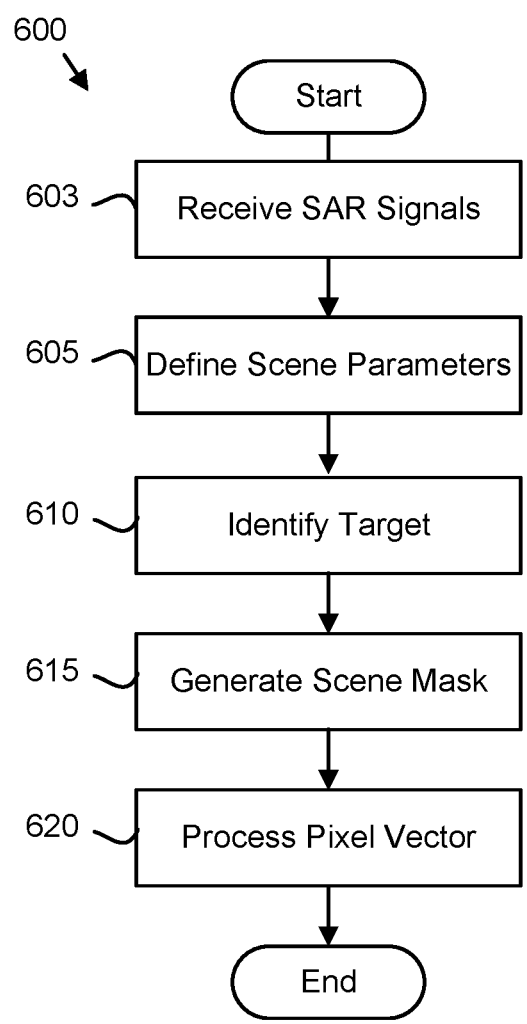
FIG. 4A is a schematic flowchart diagram illustrating one embodiment of a SAR data processing method.

FIG. 4A is a schematic flowchart diagram illustrating one embodiment of a SAR data processing method 600. The method 600 may process the SAR data 200 and enhance the pixel vector 240. The method 600 may be performed by the SAR 105 and semiconductor arithmetic units. In addition, the method 600 may be performed by one or more processors 405. In one embodiment, the method may be performed by a computer readable storage medium such as the memory 410. The computer readable storage medium may store code that is executed by the processor 405 to perform the functions of the method 600.

The method 600 starts, and in one embodiment, the SAR 105 receives 602 a plurality of SAR signals 160. The SAR signals 160 may be received in response to illuminating the scene 165 with electromagnetic pulses 155.

The processor 405 may define 605 the scene parameters 270 for the scene 165. The scene parameters 270 may be specific to a reflectivity of the scene 165.

The processor 405 may identify 610 the target 170 from the pixel vector 240. The target 170 may be identified automatically in response to possessing distinguishing features. Alternatively, the target 170 may be selected by an operator. The target 170 may be a region of interest 305. The pixel vector 240 may be generated from the region of interest 305. In addition, the pixel vector 240 may include the data size 310 required to model the region of interest 305.

The processor 405 may generate 615 a scene mask 230 for the region of interest 305. The scene mask 230 may be predefined based on the specified target 170 and/or pixel vector 240. Alternatively, the scene mask 230 may be dynamically calculated to correspond to the region of interest 305, the pixel vector 240, and/or the specified target 170.

In one embodiment, the processor 405 processes 620 the pixel vector 240 and the method 600 ends. The processing 620 of the pixel vector 240 is described in more detail in FIG. 4B.

Figure 4B:
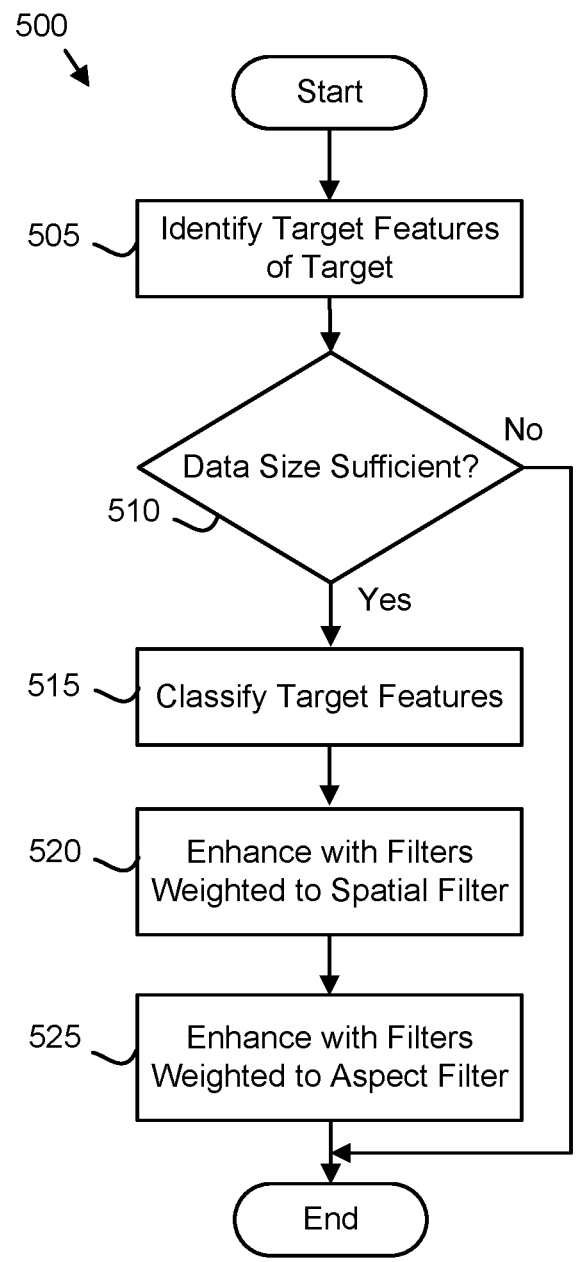
FIG. 4B is a schematic flow chart diagram illustrating one embodiment of a pixel vector enhancement method.

FIG. 4B is a schematic flow chart diagram illustrating one embodiment of a pixel vector enhancement method 500. The method 500 may be performed by semiconductor arithmetic units. Alternatively, the method 500 may be performed by a processor 405. In one embodiment, the method 500 is performed by a computer readable storage medium such as the memory 410. The computer readable storage medium may store program code that is executed by the processor 405.

The method 500 starts, and in one embodiment, the processor 405 identifies 505 target features 260 of the pixel vector 240 from the plurality of SAR signals 160. The target features 260 may include geometric arrangements of pixels 320.

In one embodiment, the processor 405 determines 510 if the data size 310 is sufficient for the region of interest 305 of the pixel vector 240. If the data size 310 is not sufficient for the region of interest 305, the method 500 ends.

If the data size 310 is sufficient for the region of interest 305, the processor 405 further classifies 515 the target 170 from the target features 260. The target 170 may be classified 515 as one or more of a planar target, an object target, a point-scattering target, a diffuse scattering target, and a polarized signal target. The classification may be recorded in the target classification 235 of the pixel vector 240.

The target 170 may be classified 515 as a planar target in response to having SAR signals 160 with low magnitude deviation over a specified target area. In one embodiment, the magnitude deviation of the SAR signals 160 is less than a planar magnitude deviation threshold. The planar magnitude deviation threshold may be in the range of 5 to 20 percent.

The target 170 may be classified 515 as an object target in response to having SAR signals 160 with a high magnitude deviation over the specified target area. In one embodiment, the magnitude deviation of the SAR signals 160 is greater than an object magnitude deviation threshold. The object magnitude deviation threshold may be in the range of 25 to 90 percent.

The target 170 may be classified 515 as a point-scattering target in response to the SAR signals 160 scattering from a single reflective point at the target 170. For example, a car may scattering the SAR signals 160 from a single point and be classified 515 as a point-scattering target.

The target 170 may be classified 515 as diffuse scattering target in response to a diffuse pattern of SAR signals 160. A tree may reflect a diffuse pattern of SAR signals 160 and be classified 515 as a diffuse scattering target.

The target 170 may be classified 515 as a polarized signal target in response to the SAR signals 160 being have a significantly higher magnitude for a first polarization than for a second polarization. For example, a geometric feature such as a building edge may reflect a SAR signal 160 with a first polarization with a higher magnitude than a SAR signal 160 with a second polarization and be classified as a polar signal target.

In one embodiment, the processor 405 enhances 520 the pixel vector 240 with the filters 125, 130 weighted to the spatial filter 130 in response to classifying 510 the target as a planar target. In a certain embodiment, the filter weights 265 are selected for a target classification 235 that includes the planar target. For example, the filter weights 265 of Tables 1 and/or 2 may be selected for a target classification 235 that includes the planar target.

In addition, the processor 405 may enhance 525 the pixel vector 240 with the filters 125, 130 weighted to the aspect filter 125 in response to classifying 510 the target 170 as an object target. The filter weights 265 may be selected for a target classification 235 that includes the object target. For example, the filter weights 265 of Tables 1 and/or 2 may be selected for a target classification 235 that includes the object target.

The embodiments identify the target features 260 of the target 170 and classify the target 170 from the target features 260. In addition, the embodiments enhance the pixel vector 240 in response to the target classification 235. As a result, noise is reduced for planar targets 170b such as open ground while distinguishing features are enhanced for object targets 170a such as buildings or vehicles.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving, by use of a synthetic aperture radar (SAR), a plurality of SAR signals;
   identifying, by use of a processor, target features of a target from the plurality of SAR signals;
   classifying the target as one of a planar target and an object target from the target features; and
   enhancing a pixel vector of the target in response to the target classification with an aspect filter weighted with an aspect filter weight and a spatial filter weighted with a spatial filter weight, wherein the spatial filter weight is weighted in the range of 60-90 percent and the aspect filter weight is weighted in the range of 10-40 percent in response to classifying the target as the planar target, and the spatial filter weight is weighted to 10-40 percent and the aspect filter weight is weighted in the range of 60-90 percent in response to classifying the target as the object target, and the pixel vector comprises pixels that are distinguished from adjacent pixels in one or more synthetic apertures of the plurality of SAR signals.

2. The method of claim 1, wherein the target is classified in response to a data size sufficient for a region of interest of the pixel vector.

3. The method of claim 1, wherein the spatial filter comprises a low pass filter.

4. The method of claim 1, wherein the spatial filter determines a mean of the plurality of SAR signals.

5. The method of claim 1, wherein the aspect filter comprises a high pass filter.

6. The method of claim 1, wherein the aspect filter comprises a glint filter that filters coherent scattering of the plurality of SAR signals.

7. The method of claim 1, wherein the pixel vector is further enhanced with filters weighted to a polar metric filter that filters unpolarized SAR signals of the plurality of SAR signals in response to classifying the target as a polarized signal target.

8. The method of claim 1, wherein the spatial filter weight is weighted in the range of 70-80 percent and the aspect filter weight is weighted in the range of 20-30 percent in response to classifying the target as the planar target, and the spatial filter weight is weighted to 20-30 percent and the aspect filter weight is weighted in the range of 70-80 percent in response to classifying the target as the object target.

9. A program product comprising a non-transitory computer readable storage medium that stores code executable by a processor to perform:
receiving, by use of a synthetic aperture radar (SAR), a plurality of SAR signals;
identifying target features of a target from the plurality of SAR signals;
classifying the target as one of a planar target and an object target from the target features; and
enhancing a pixel vector of the target in response to the target classification with an aspect filter weighted with an aspect filter weight and a spatial filter weighted with a spatial filter weight, wherein the spatial filter weight is weighted in the range of 60-90 percent and the aspect filter weight is weighted in the range of 10-40 percent in response to classifying the target as the planar target, and the spatial filter weight is weighted to 10-40 percent and the aspect filter weight is weighted in the range of 60-90 percent in response to classifying the target as the object target, and the pixel vector comprises pixels that are distinguished from adjacent pixels in one or more synthetic apertures of the plurality of SAR signals.

10. The program product of claim 9, wherein the target is classified in response to a data size sufficient for a region of interest of the pixel vector.

11. The program product of claim 9, wherein the spatial filter comprises a low pass filter.

12. The program product of claim 9, wherein the spatial filter determines a mean of the plurality of SAR signals.

13. The program product of claim 9, wherein the aspect filter comprises a high pass filter.

14. The program product of claim 9, wherein the aspect filter comprises a glint filter that filters coherent scattering of the plurality of SAR signals.

15. The program product of claim 9, wherein the pixel vector is further enhanced with filters weighted to a polar metric filter that filters unpolarized SAR signals of the plurality of SAR signals in response to classifying the target as a polarized signal target.

16. A system comprising:
a synthetic aperture radar (SAR) that receives a plurality of SAR signals;
a processor;
a memory that stores code executable by the processor to perform:
identifying target features of a target from the plurality of SAR signals;
classifying the target as one of a planar target and an object target from the target features; and
enhancing a pixel vector of the target in response to the target classification with an aspect filter weighted with an aspect filter weight and a spatial filter weighted with a spatial filter weight, wherein the spatial filter weight is weighted in the range of 60-90 percent and the aspect filter weight is weighted in the range of 10-40 percent in response to classifying the target as the planar target, and the spatial filter weight is weighted to 10-40 percent and the aspect filter weight is weighted in the range of 60-90 percent in response to classifying the target as the object target, and the pixel vector comprises pixels that are distinguished from adjacent pixels in one or more synthetic apertures of the plurality of SAR signals.

17. The system of claim 16, wherein the target is classified in response to a data size sufficient for a region of interest of the pixel vector.

18. The system of claim 16, wherein the spatial filter comprises a low pass filter.

19. The system of claim 16, wherein the spatial filter determines a mean of the plurality of SAR signals.

20. The system of claim 16, wherein the aspect filter comprises a high pass filter.

* * * * *